No. 745,379. PATENTED DEC. 1, 1903.
J. PEARSON & F. R. M. CUTCHEON.
MEANS FOR PROTECTING ELECTRICAL WINDINGS FROM STATIC STRAINS.
APPLICATION FILED JUNE 13, 1902.
NO MODEL. 3 SHEETS—SHEET 1.

Witnesses.
H. A. Kilgore
A. H. Opsahl

Inventors:
John Pearson,
Frederick R. M. Cutcheon,
By his Attorneys.
Williamson & Merchant No. 745,379. PATENTED DEC. 1, 1903.
J. PEARSON & F. R. M. CUTCHEON.
MEANS FOR PROTECTING ELECTRICAL WINDINGS FROM STATIC STRAINS.
APPLICATION FILED JUNE 13, 1902.
NO MODEL. 3 SHEETS—SHEET 2.

No. 745,379. PATENTED DEC. 1, 1903.
J. PEARSON & F. R. M. CUTCHEON.
MEANS FOR PROTECTING ELECTRICAL WINDINGS FROM STATIC STRAINS.
APPLICATION FILED JUNE 13, 1902.
NO MODEL. 3 SHEETS—SHEET 3.
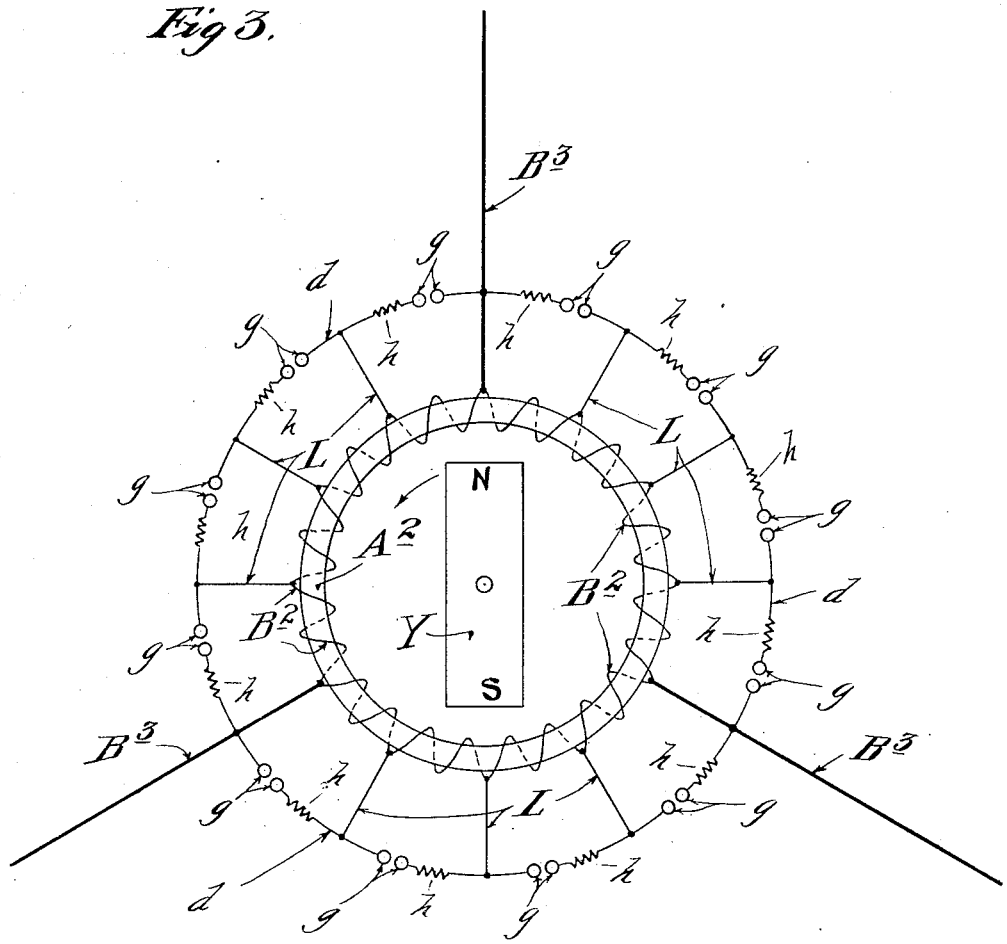

No. 745,379. Patented December 1, 1903.

UNITED STATES PATENT OFFICE.

JOHN PEARSON, OF SOMERSET, WISCONSIN, AND FREDERICK R. M. CUTCHEON, OF ST. PAUL, MINNESOTA, ASSIGNORS, BY MESNE ASSIGNMENTS, TO THEMSELVES AND JAMES F. WILLIAMSON.

MEANS FOR PROTECTING ELECTRICAL WINDINGS FROM STATIC STRAINS.

SPECIFICATION forming part of Letters Patent No. 745,379, dated December 1, 1903.

Application filed June 13, 1902. Serial No. 111,464. (No model.)

*To all whom it may concern:*

Be it known that we, JOHN PEARSON, residing at Somerset, in the county of St. Croix and State of Wisconsin, and FREDERICK R. M. CUTCHEON, residing at St. Paul, in the county of Ramsey and State of Minnesota, citizens of the United States, have invented certain new and useful Improvements in Means for Protecting Electrical Windings from Static Strains; and we do hereby declare the following to be a full, clear, and exact description of the invention, such as will enable others skilled in the art to which it appertains to make and use the same.

Our invention has for its object to provide an efficient means for the protection of electrical windings from static strains.

The invention is especially designed for the protection of high-voltage windings, such as the windings of transformers and generator-armatures, from static strains produced by lightning or other causes.

To the ends above noted the invention consists of the novel devices and combinations of devices hereinafter described, and defined in the claims.

The invention is illustrated in the accompanying drawings, wherein like notations refer to like parts throughout the several views.

Figure 1:
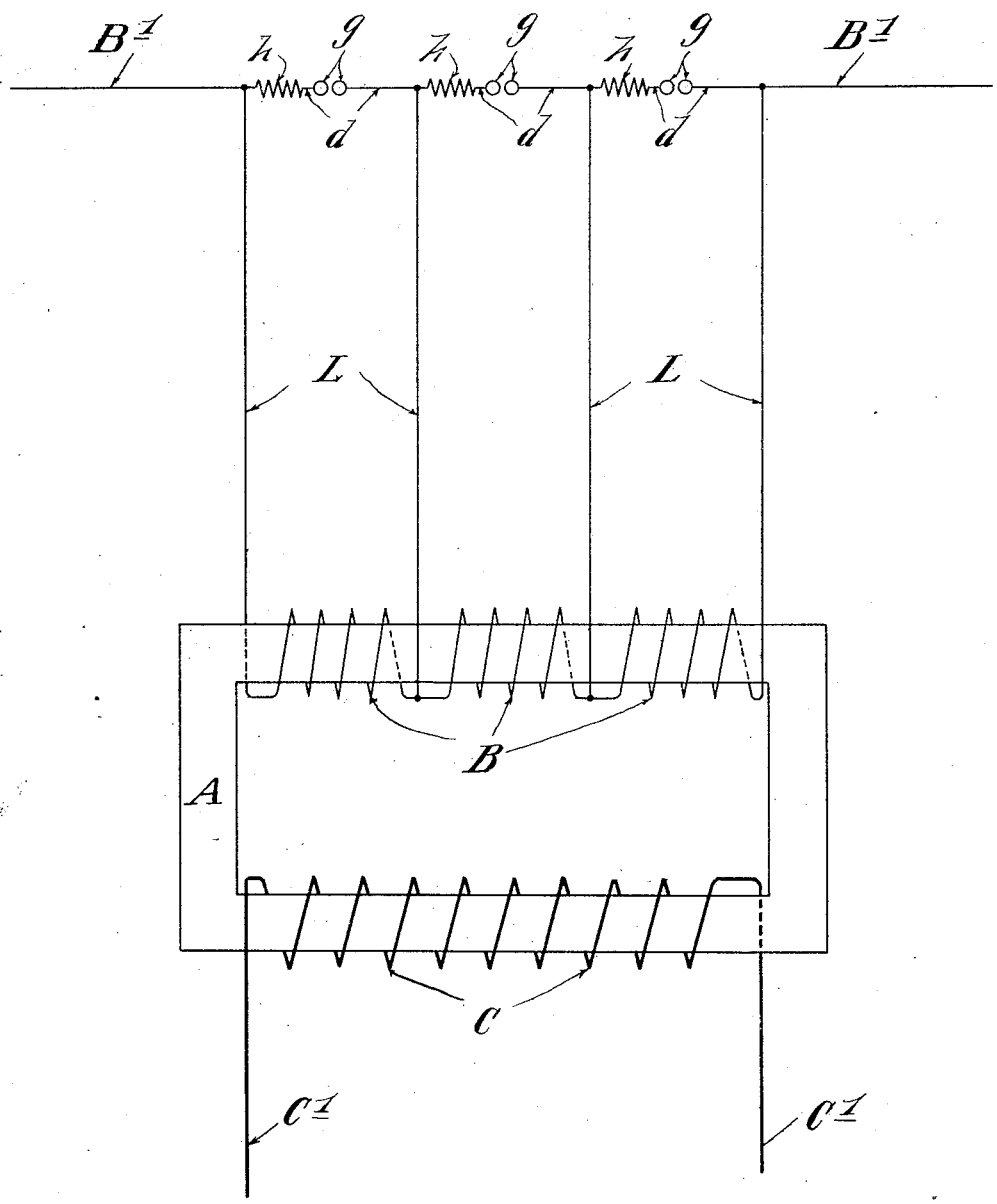
Figure 2:
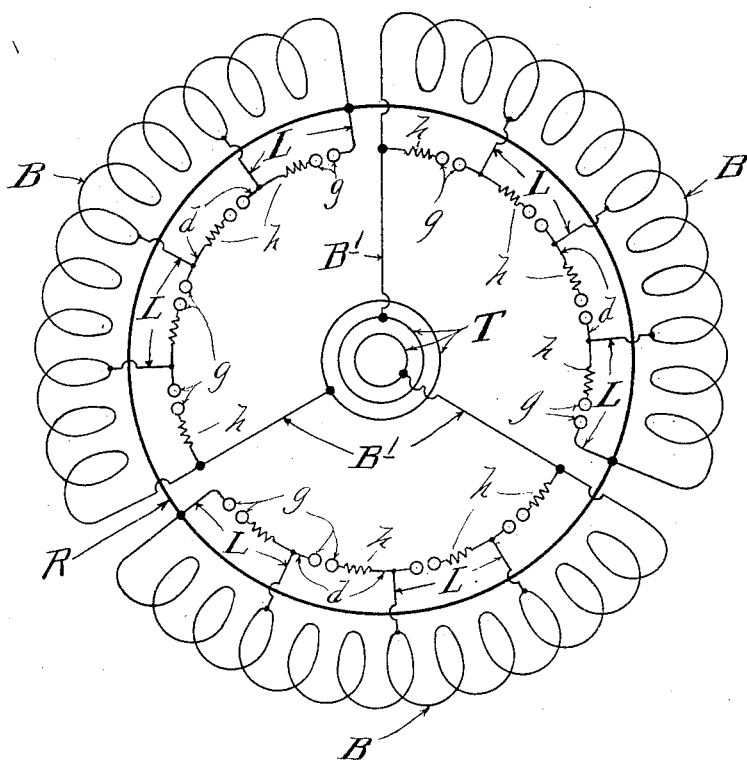

In said drawings, Figure 1 is a diagram showing our invention as applied to transformers. Fig. 2 is a diagram showing our invention as applied to the armature of a three-phase alternating generator. Fig. 3 is a diagram showing our invention as applied to the armature of a three-phase alternating generator wherein the armature is stationary and the field revolves.

A high-voltage winding, such as that employed in transformers and armatures, is made up of a large number of turns. If leads were brought out from equidistant points across the entire winding and the voltages were measured between these leads, substantially the same voltage would under normal conditions be found between every pair of leads, and the sum of said several voltages would of course equal the full voltage of the entire winding. For example, suppose a transformer-winding is made up of six coils (which is a common type) and that the difference of potential between the terminals of the entire winding is fourteen thousand volts. Then the difference of potential between the terminals of each of said six coils under normal conditions would be two thousand three hundred and thirty-three and one-third volts. Otherwise and briefly stated, the voltage under normal conditions is substantially the same throughout all the coils. It may be assumed for illustration that a transformer is constructed to stand for a short time double the normal voltage without burning out. Otherwise stated, if the normal voltage between each of the said six coils is two thousand three hundred and thirty-three and one-third volts the said coils might possibly stand for a short time four thousand six hundred and sixty-six and two-third volts; but if this safety limit should be exceeded burn-outs would probably occur. A transformer cannot widely vary from normal conditions of voltage without injurious results. Under static disturbances produced by lightning or other causes the conditions become widely different from normal and the voltage may far surpass the limit which the winding will stand. For example, in long-distance overhead transmission-lines it is found that waves of high and dangerous voltage are frequently set up, produced by lightning or other causes, and, notwithstanding the presence or use of the ordinary standard lightning-arresters between the transmission-line and the ground, that these high-voltage waves will be forced through the high-tension windings of the transformers, and generally under such serious disturbances the coils of the transformer will be short-circuited and broken down. It has been observed, for instance, that in long-distance high-tension transmission-lines the high-tension coils of the step-up transformers were most seriously affected by lightning charges at that part of the coil where the charge entered, and it was frequently found that the terminals of adjacent coils nearest the line on which the static charge came in were short-circuited, while those more remote from the line were not affected. In every instance where the terminals of severals coils have been short-circuited it has been those in regular order, beginning nearest the line by which the charge entered. Of course where the copper connections between the adjacent coils were thus short-circuited the working current followed instantly, maintaining an arc and burning off the connections in each case. This peculiar effect of the heavy charge upon the winding indicates that the abnormal voltage tends to "pile up" on the terminal coils of the winding nearest the line by which the charge enters and that if the winding is to be protected this piling up of the voltage must be prevented.

With the latter object in view it is the purpose of our invention to provide means for distributing the static charge over the entire winding, thereby to a large degree dissipating the charge and evening up or distributing the voltage to a considerable extent among the several sections or coils of the transformer or other electrical winding, so that the voltage due to the external charge is kept within the limit of safety as regards any two points on the winding.

Referring to the diagram Fig. 1, A represents the core, B the high-tension winding, and C the low-tension winding, of a step-up transformer. The terminals of the high-tension winding B are marked B', one of which taps or forms part of the transmission-line and the other of which may be assumed to be connected to the common center of a group of transformers or with the transmission-line if a delta connection or single-phase system be employed. The terminals of the low-tension winding C are marked C' and may be assumed to connect with the source of supply. Between the terminals B' of the high-tension winding we provide a static by-pass, shown as made up of sectional conductors $d$, containing suitable non-inductive series resistance $h$ and terminating each in knobs $g$, spaced apart to afford suitable air-gaps between the successive sections of said by-pass conductor. The air-gaps between the knobs $g$ are preferably about one-sixteenth of an inch. We then bring out from equidistant points of the high-tension winding B leads L, which connect, respectively, each with one of the sectional conductors $d$ of the static by-pass. The said leads L may therefore be said to space apart or mark off successive sections of the high-tension winding corresponding to the sections of the by-pass conductor, and these sections of the high-tension winding thus spaced apart or marked off by the leads L contain substantially equal numbers of turns. The knobs $g$ are of course composed of some suitable non-arcing metal. The non-inductive series resistance $h$ may be composed of any suitable material, such as ground graphite and slate molded into form. It will be observed that what we have hereinbefore designated a "static by-pass" is a high-resistance non-inductive circuit subsidiary to the winding-circuit and so related thereto that while it is a non-conductor to the normal voltages in the system of which the winding is a part it constitutes a readily-conducting path for the passage of abnormal voltages on the winding. By dividing this subsidiary circuit into a series of separate resistance elements or sections and connecting the several sections with corresponding sections of the winding heavy static charges or abnormal voltages which would otherwise tend to pile up on certain sections of the winding will be distributed by way of the connected subsidiary circuit-sections to adjacent coil-sections, and as each resistance-section protects its corresponding winding-section the joint effect of the several sections of the said subsidiary circuit will be to divert too-dangerous charges from any particular winding-section, and therefore from the winding as a whole. With this construction (shown in Fig. 1) the static charge produced by lightning or other cause will pass from one section to the other over one section of the static by-pass and a pair of the leads L in succession in regular order as the air-gaps in the by-pass break down. The construction is such that the air-gaps in the static by-pass will break down at some voltage within the safety limit of the coil or section of the winding connected to the sectional conductor of the by-pass containing the air-gap. Hence the voltage cannot pile up on the terminal coil, but will pass in succession over the leads L and through the sections of the static by-pass to the successive sections of the high-tension winding, thereby becoming distributed over the entire winding and keeping the voltage from passing the safety limit on any coil or section of the winding. For example, if under normal conditions the voltage between the terminals B' of the high-tension winding B should be assumed to be nine hundred, then under the same conditions the voltage between any pair of the leads L should be three hundred, inasmuch as said leads L may be regarded as dividing the winding B into three sections or coils. Now if the air-gaps between the knobs $g$, taken together with the series resistance $h$ of the static by-pass, would together stand a voltage of eighteen hundred before breaking down, this being double the normal voltage of the transformer, then any one air-gap and its adjacent resistance $h$ in that section of the by-pass would stand six hundred volts before breaking down; but somewhere at or near said predetermined maximum voltage of six hundred said air-gap would break down and allow the static charge to pass, thereby relieving the particular coil or section of said high-tension winding B which is being protected by that particular air-gap and parts coöperating therewith. This would then occur in succession in the successive air-gaps or as far as might be necessary to permit the static charge to become distributed over the successive coils or sections of the high-tension winding in regular order from the coil nearest the line until evened up or lowered to a point within the safety limit. On this principle, therefore, a sufficient number of leads L may be brought out to sections of the static by-pass to afford any desired margin of protection.

Referring to the diagram Fig. 2, wherein the invention is shown as applied to the armature of a generator, the principle involved is exactly the same as when applied to transformers. The only differences are such as are incidental to the differences in the two classes of machines. The armature shown in Fig. 2 has a star-winding, and the several windings are marked with the same references B as in the transformers. The terminals of the windings B are connected by the static by-pass made up of the section-conductors separated by air-gaps, just as in Fig. 1, the elements thereof being marked with the same notations—to wit., $d$, $g$, and $h$, as in Fig. 1. The common connection for the several coils or windings of the armature in Fig. 2 is marked R and the collector-rings marked T. The leads from the collector-rings T are not shown; but it will be understood that these leads may be directly connected to the transmission-line.

In Fig. 3 the invention is shown as applied to the armature of a three-phase alternating generator wherein the armature is stationary and the field revolves. Moreover, in this instance the winding $B^2$ of the armature-core $A^2$ is continuous. The revolving field is marked Y. The transmission-leads $B^3$ lead off from the coil or winding $B^2$ at equidistant points of the circle, and the leads L, passing out from the winding $B^2$ to the sectional conductors of the static by-pass $d\ g\ h$, space off between the same equal numbers of the turns of said winding $B^2$. The general action of the invention as applied in Figs. 2 and 3 is the same as when applied to transformers, and any restatement of the action is deemed unnecessary.

It will be understood, of course, that while we have illustrated our invention as applied to transformers and armatures the same is capable of general application wherever the corresponding functions are desired.

It must be understood, of course, that the details of the construction of the by-pass might be varied without departing from the spirit of the invention and that the ordinary standard lightning-arresters would continue to be used between the transmission-line and the ground in the usual way.

The great feature of the invention turns on the presence of the leads brought out from different points of the winding to corresponding points of the static by-pass, thus connecting successive sections of the winding over successive sections of the by-pass and permitting the static charge to pass thereover in succession from one section of the winding to the other, thereby quickly distributing the static charge among all the sections of the winding and keeping the voltage within the safety limit throughout the winding.

What we claim, and desire to secure by Letters Patent of the United States, is as follows:

1. The combination of an electrical winding, and means for protecting the same from static strains or abnormal voltages, said means comprising a circuit subsidiary to said winding and so connected with the circuit of the winding as to constitute a conductor for abnormal voltages on the winding and a non-conductor for normal voltages thereon, and connections between successive sections of said winding and successive points in the subsidiary circuit, substantially as described.

2. The combination of an electrical winding, and means for protecting the same from static strains or abnormal voltages, said means comprising a subsidiary circuit in shunt to said winding, said subsidiary circuit being a conductor for abnormal voltages and a non-conductor for normal voltages on the winding, and connections between successive sections of said winding and successive points in said subsidiary circuit, substantially as described.

3. The combination of an electrical winding, and means for protecting the same from static strains or abnormal voltages, said means comprising a circuit subsidiary to said winding and consisting of a series of resistance-sections so disposed with relation to the circuit of the winding as to constitute a conductor for abnormal voltages on the latter and a non-conductor for the normal voltages thereon, and connections between successive sections of the winding and the separate sections of the subsidiary circuit, substantially as described.

4. The combination with an electrical winding, of a static by-pass, between the terminals of said winding, and leads brought out from different points of said winding to corresponding points of said static by-pass, which leads thus connect successive sections of the winding over successive sections of the by-pass, thereby permitting the static charge to pass in succession over said by-pass sections and leads to successive sections of the winding and preventing the piling up of the voltage on any one or more coils or sections of the winding and avoiding burn-outs, substantially as described.

5. The combination with an electrical winding, of a static by-pass between the terminals of said winding composed of conductor-sections separated by sparking-gaps and leads brought out from different points of said winding to conductor-sections of said by-pass, which leads thus connect successive sections of the winding over sections of the by-pass having sparking-gaps therein, whereby the static charge will pass over said by-pass sections and leads to successive sections of the winding thus distributing the charge and avoiding burn-outs, substantially as described.

6. The combination with an electrical winding, of a static by-pass between the terminals of said winding composed of conductor-sections containing non-inductive series resistance and separated by sparking-gaps, and leads brought out from the equidistant points of said winding to conductor-sections of said by-pass, which leads thus connect successive sections of the winding over successive sections of said by-pass containing sparking-gaps therein, whereby a static charge will pass over said by-pass sections and leads to successive sections of the winding, thus distributing the charge and avoiding burn-outs, substantially as described.

7. The combination of an electrical winding, and electrical terminals connected between successive sections of said winding to constitute conductor by-passes for abnormal voltages on the respective sections; substantially as described.

8. The combination of an electrical winding, and electrodes connected between successive sections of said winding to form spark-gaps between the terminals of the respective sections; substantially as described.

9. The combination of an electrical winding, and a series of spaced knobs connected between successive sections of said winding to constitute spark-gap by-passes for abnormal voltages on the respective sections; substantially as described.

10. In a transformer, the combination of the high-tension coil, and electrodes connected between successive sections of said coil to form spark-gaps between the terminals of the respective coil-sections; substantially as described.

In testimony whereof we affix our signatures in presence of two witnesses.

JOHN PEARSON.
FREDERICK R. M. CUTCHEON.

Witnesses:
C. H. MAUSHIP,
RALPH BOWE.